March 24, 1925.
K. HOFFMAN
MOTOR CONTROL
Filed Nov. 25, 1922
1,530,561
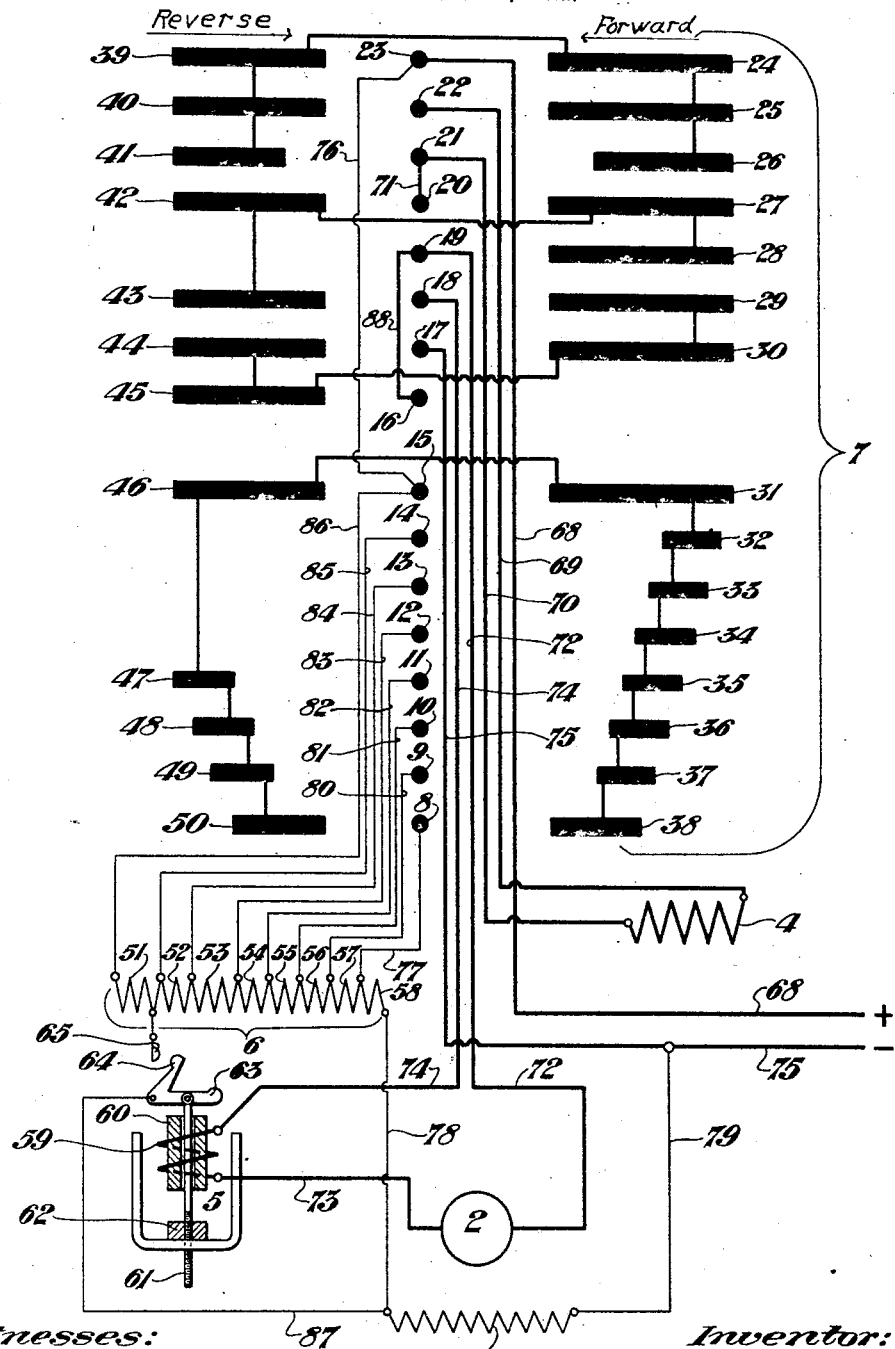
Witnesses:
Edwin Trueb
Inventor:
KARL HOFFMAN,
by:
D. Anthony Usina
his Attorney.

Patented Mar. 24, 1925.

1,530,561

UNITED STATES PATENT OFFICE.

KARL HOFFMAN, OF LORAIN, OHIO, ASSIGNOR TO NATIONAL TUBE COMPANY, OF PITTSBURGH, PENNSYLVANIA, A CORPORATION OF NEW JERSEY.

MOTOR CONTROL.

Application filed November 25, 1922. Serial No. 603,233.

*To all whom it may concern:*

Be it known that I, KARL HOFFMAN, a citizen of the United States, and resident of Lorain, in the county of Lorain and State of Ohio, have invented certain new and useful Improvements in Motor Controls, of which the following is a specification.

This invention relates to motor controls and while not limited thereto relates particularly to controls for the driving motors of coupling screwing machines and the like, in which the work load varies during the course of the work operation.

The primary object of the present invention is to provide means for controlling the operating motor of coupling screwing machines and the like, which will permit the motor to operate at high speed while the work load is light, and to automatically slow down said motor when the work load exceeds a predetermined maximum.

Another object is to provide a motor control for coupling threading machines and the like having the novel combination of elements described in the following specification and illustrated in the accompanying drawings.

The drawings illustrate diagrammatically the motor control of this invention as applied to the adjustable speed shunt field operating motor of a coupling screwing machine or the like.

Referring more particularly to the drawings, the numeral 2 designates the motor armature, the numeral 3 designates the motor shunt field, the numeral 4 designates the armature starting resistance, the numeral 5 designates the decelerating relay, the numeral 6 designates the decelerating resistance as a whole, and the numeral 7 designates the master controller as a whole.

The master controller 7 is provided with a plurality of contact fingers 8 to 23 inclusive, and a plurality of forward and reversing contact segments 24 to 38 inclusive and 39 to 50 inclusive, respectively. The contact segments of the controller are adapted to be moved into contact with the contact fingers in making the various motor circuits.

The contact segments are arranged in groups as follows—24 to 26 and 39 to 41 inclusive; 27, 28, 42 and 43; 29, 30, 44 and 45; and 31 to 38 and 46 to 50 inclusive. The segments of each of the above groups are electrically connected through the controller drum and each group is insulated from the other.

The field resistance 6 is composed of a plurality of connected resistance sections 51 to 58 inclusive, adapted to be cut successively into series with the field energization circuit to weaken the energization of the field and thus increase the speed of the motor.

The decelerating relay is composed of an operating coil 59 which is connected in series with the motor armature 2, and arranged around a hollow magnetic core 60, which is adapted to be energized thereby. A non-magnetic plunger stem 61 is mounted within the core 60 and carries a plunger head 62 of magnetic material which is adjustably threaded on the lower end thereof, and is adapted to be attracted by the core 60 when it is sufficiently energized.

The plunger stem 61 has its upper end operatively connected to a pivoted switch lever 63 having a contact 64 on its end adapted to engage a contact 65 when the stem 61 is raised, thus short circuiting the resistance sections 52 to 58, respectively.

The operation of this motor control, in a general way, assuming that the work operation is one in which the load on the motor is progressively greater, such as screwing couplings on pipe, is as follows—When the work operation is started the current flowing through the coil 59 is not sufficient to energize the core 60 sufficiently to raise the plunger head 62 and stem 61, so that the resistance sections 51 to 58 inclusive remain in series with the field 3, thus weakening the field and causing the motor to speed. As the load on the motor, and consequently the current value in the armature circuit, becomes greater the coil 59 will become sufficiently energized to raise the plunger stem 61 and head 62, thus closing the contacts 64 and 65 and short circuiting or cutting out the resistance sections 52 to 58 inclusive and increasing the current value to the shunt field 3 so as to slow down the motor speed.

The operation will now be described in detail and the several circuits traced through one complete cycle of operation.

In the forward direction of the motor armature 2 the controller segments 24 to 38 inclusive will be moved in the direction of the arrow marked forward, thus making contact with their respective fingers 8 to 17 inclusive in proper sequence. On the first point or in the first position of the controller, segments 24, 25, 27, 28, 29, 30, 31 and 38 make contact with the controller contact fingers 23, 22, 20, 19, 18, 17, 15 and 8, respectively, and the following circuits are established—from the plus line 68 to finger 23, segments 24 and 25, finger 22, wire 69, armature starting resistance 4, wire 70, finger 21, wire 71, finger 20, segments 27 and 28, finger 19, wire 72 to one side of armature 2, through armature 2 to wire 73, coil 59, wire 74, finger 18, segments 29 and 30, finger 17, wire 75 to minus side of line. A shunt circuit to field 3 is also made from finger 23 through wire 76, finger 15, segments 31 to 38 inclusive, finger 8, wire 77, resistance section 58, wire 78, shunt field 3, wire 79, and wire 75 to line, thus energizing the shunt field. The motor starts to operate on the first position of the controller and when it has obtained the proper speed, it is further accelerated by moving the controller to the second position. In the second position all of the segments 24, 25, 27, 28, 29, 30, 31 and 38 remain in contact with their respective fingers, and in addition segment 26 makes contact with the finger 21, thus short circuiting the armature or starting resistance 4 and establishing a new armature circuit from the plus line 68 to finger 23, segments 24, 25, 26, finger 21, wire 71, finger 20, segments 27, 28, finger 19, wire 72, armature 2, wire 73, coil 59, wire 74, finger 18, segments 29, 30, finger 17, wire 75 to minus side of line.

No further change in the armature circuit occurs during the forward direction of the motor, and further acceleration is had by inserting resistance in series with the shunt field 3, thus weakening the field.

As the controller is moved to the third position the segment 38 passes and breaks contact with the finger 8 and segment 37 makes contact with finger 9, thus making the shunt field circuit from segment 37, through finger 9, wire 80, and resistance sections 57 and 58, wire 78, field 3, wire 79, wire 75 to line, weakening the energization of the field and allowing the motor to increase its speed.

It will be noted here that the resistance section 58 remains in series with the shunt field 3 at all times except when the contacts 64 and 65 of the decelerating relay 5 are closed and serves to prevent the motor from running too slow before the shunt field control comes into play.

As the controller is moved into the fourth, fifth, sixth, seventh, eighth and ninth positions, respectively, the segments 36 to 32 inclusive make and break contact with fingers 10 to 14, inclusive in succession, thus adding in succession, field resistance sections 56 to 51 inclusive in series with sections 57 and 58 and shunt field 3 through wires 81 to 86 inclusive, respectively. In the ninth or last forward position of the controller segments 38 to 32 inclusive have passed and broken contact with their respective fingers 8 to 14, inclusive, while segment 31 remains on finger 15, it having maintained this position throughout the entire forward range. In this ninth or last forward position the shunt field circuit is a follows—from the finger 15, through wire 86 to and through the resistance sections 51 to 58 inclusive, wire 78, field 3, wire 79, and wire 75 to line.

When the controller is in this position the motor is at full speed, and as the load on the motor increases it results in an increase of current through the armature 2 and consequently in coil 59 of the decelerating relay. This increased current increases the magnetic attraction between core 60 and plunger 62 and the plunger is raised toward core 60, thus lifting stem 61, which in turn moves lever 63 and closes contacts 64 and 65.

When the contacts 64 and 65 are closed, the field resistances 52 to 58 inclusive are short circuited or cut out of series with the field 3, thus permitting the field 3 to receive a stronger current, therefore increasing its energization and decreasing the motor speed. At the decreased speed of the motor less power is required to drive the load, therefore the current in coil 59 drops to a point which allows plunger 62 to fall and open contacts 64, 65. When the contacts 64, 65 open all the resistance sections 51 to 58 inclusive are again put in series with the shunt field 3, thus weakening the energization of this field and permitting the motor to again speed up, but immediately upon the motor speeding up the power required increases, and the current in coil 59 again rises to a value sufficient to close contacts 64 and 65 which again short circuit the resistance sections 52 to 58 inclusive and cause the motor to slow up as heretofore described. These changes in speed and current are very rapid and give the contacts 64 and 65 a vibrating motion which causes the establishment of a resultant shunt field strength and consequent resultant motor speed that is desired for the increased work load. By the adjustment of the plunger 62 on the stem 61 the load at which the relay 5 will operate may be adjusted.

The shunt field circuit when the contacts 64 and 65 are closed is from the finger 23, through wire 76 to finger 15, through wire 86, resistance section 51, contacts 64 and 65, wire 87, shunt field 3, wire 79, wire 75 to line.

In the reverse direction of rotation assuming that the maximum load is upon the motor at the beginning of the reverse operation, the decelerating relay will function in precisely the same manner as described for the forward direction of rotation and will prevent the motor from running at a higher speed until the load becomes lighter, at which time the current value will drop in coil 59 to a point where core 60 will no longer operate to hold plunger 62 in raised position and contacts 64 and 65 will break contact, and the motor will attain a speed determined by the position of the drum controller.

In the reverse operation, segments 39 to 50, inclusive, make contact with the corresponding fingers 23, 22, 21, 20, 18, 17, 16, 15, 11, 10, 9 and 8 in proper sequence. There are only five controller positions in the reverse operation. In the first position the following circuits are established—from plus side of line through wire 68 to finger 23, to segments 39, 40, finger 22, wire 69, armature resistance 4, wire 70, finger 21, wire 71, finger 20, segments 42 and 43, finger 18, wire 74, coil 59, wire 73, armature 2, wire 72, finger 19, wire 88, finger 16, segments 45 and 44, finger 17, wire 75 to minus side of line. The above circuit causes the current to flow through the armature in the reverse direction.

The shunt field circuit is taken from the finger 23 and is as follows—from finger 23 through wire 76, finger 15, segments 46 to 50 inclusive, finger 8, wire 77, resistance section 58, wire 78, field 3, wire 79, and wire 75 to line.

In the second position of the controller in the reverse direction, segment 41 makes contact with finger 21, and armature resistance 4 is short circuited and the following circuit established—from plus side of line through wire 68 to finger 23, segments 39, 40 and 41, finger 21, wire 71, finger 20, segments 42 and 43, finger 18, wire 74, coil 59, wire 73, armature 2, wire 72, finger 19, wire 88, finger 16, segments 45, 44, finger 17 and wire 75 to minus side of line. In the second position the field shunt circuit remains unchanged.

In the third reverse position of the controller the segment 50 breaks contact with the finger 8 and segment 49 makes contact with the finger 9, thereby making the shunt field circuit from segment 49, through finger 9, wire 80, resistance sections 57 and 58, wire 78 to field 3. In the fourth reverse position of the controller, the segment 49 breaks contact with the finger 9 and segment 48 makes contact with the finger 10, thereby making the shunt field circuit from the segment 48, through finger 10, wire 81, resistance sections 56, 57, 58, wire 78 to field 3. In the fifth reverse position the segment 48 breaks contact with the finger 10 and segment 47 makes contact with the finger 11 and segment 46 is still in contact with finger 15, and the shunt field circuit is from the segment 47 through finger 11, wire 82, resistance sections 55, 56, 57 and 58, wire 78 to field 3, wire 79, wire 75 to line. With this last circuit complete the motor will rotate at its maximum reverse speed.

If in the reverse operation of the motor the load increases beyond the maximum at which the decelerating relay is set to operate, the contacts 64 and 65 will be closed as in the forward operation, short circuiting the resistance sections 55, 56, 57 and 58 and making a shunt circuit to the field 3 as follows—from the finger 23, through wire 76 to finger 15, wire 86, resistance section 51, contacts 64 and 65, wire 87, shunt field 3, wire 79, wire 75 to line.

From the above detailed description it will be readily appreciated that I have provided a novel automatic control for the operating motor of coupling screwing machines and the like, in which the load increases as the work progresses, and in which it is desirable and necessary that motor speed decrease as the load increases.

While I have illustrated and described only one embodiment of my invention it will be understood that I do not wish to be limited to the specific details thereof, since various substitutions of equivalents and modifications of design may be made without departing from the scope of my invention as defined in the appended claim.

I claim:—

A motor control for the operating motors of coupling screwing machines and the like, in which the work load varies during the course of the work operation, comprising the combination with an electric motor having an armature and shunt field, of a plurality of resistance sections adapted to be cut into series with said field, a master controller having a plurality of contacts thereon for making and breaking the circuits to said armature and said field, other contacts on said controller adapted to successively cut said resistance sections into series with said field to thereby weaken the energization of said field and cause a consequent speeding up of said motor, and a decelerating relay in series with said armature adapted to automatically cut the major portion of said resistance sections out of series with said field when the current value of the armature circuit is increased beyond a predetermined value due to an increased load on the motor.

In witness whereof, I have hereunto signed my name.

KARL HOFFMAN.